United States Patent Office 3,331,585
Patented July 18, 1967

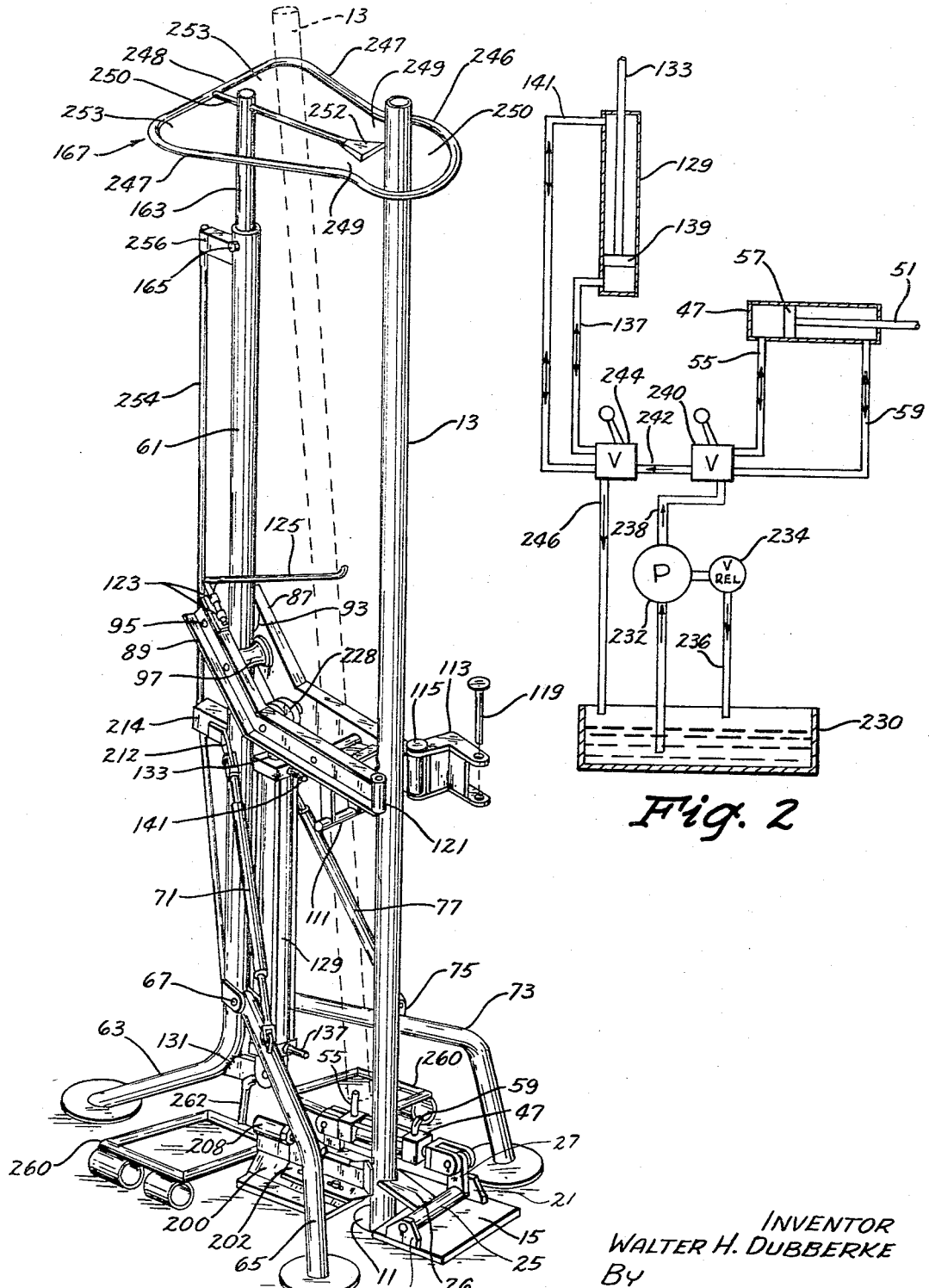

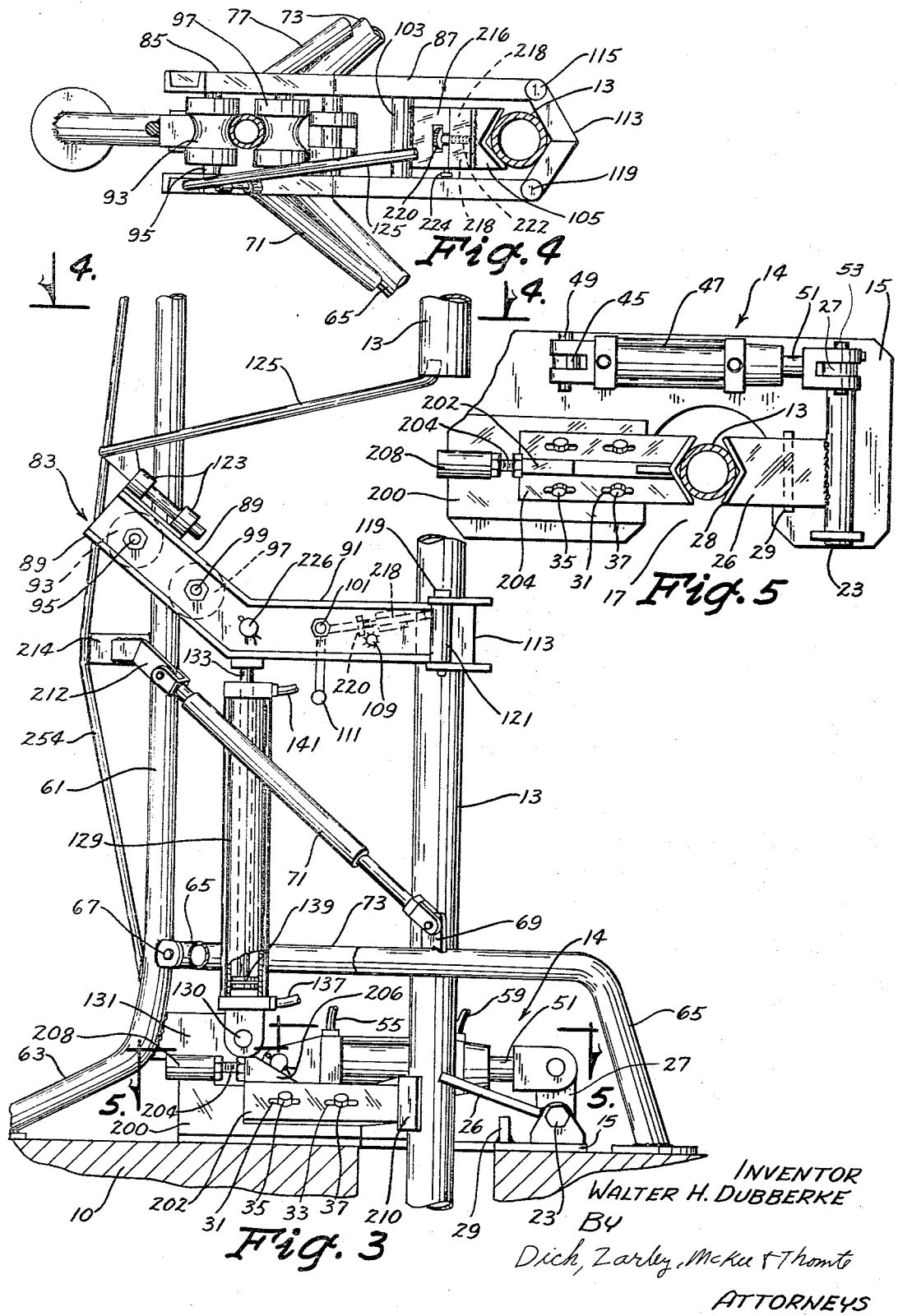

3,331,585
PIPE PULLING DEVICE
Walter H. Dubberke, Box 314, Hubbard, Iowa 50122
Filed May 4, 1966, Ser. No. 547,523
8 Claims. (Cl. 254—31)

This application is a continuation-in-part application of my co-pending application, Ser. No. 420,614, filed Dec. 23, 1964, now Patent No. 3,290,006.

This invention relates to a pipe pulling device and more particularly to a well pipe pulling device.

It is one of the primary objects of this invention to provide a pipe pulling device having a pipe lifting means, a pipe holding means, and a pipe guide and storage means.

A related object of this invention is to provide a pipe pulling device having a pipe guide means positioned above the pipe lift means whereby as pipe is removed from a well or the like it may be readily taken apart and temporarily stored.

A still further related object of this invention is to provide a pipe pulling device having a pipe stand rack adjacent the supporting surface and pipe guide assembly for guiding the pipe out of the ground and holding it on the pipe stand rack after the pipe has been disassembled.

A still further related object of this invention is to provide a pipe stand rack extending between the pipe pulling device and the ground to stabilize the pipe pulling device.

Yet another object of this invention is to provide a pipe pulling device having a pair of pipe stand racks extending outwardly from opposite sides thereof for engagement with the ground and thereby stabilizing the pipe pulling device.

Another important object of this invention is to provide a pipe pulling device having an upstanding support member on which a lifting means is carried and is moved by a power cylinder disposed between the standing support member and the pipe whereby a minimum of stress on the upstanding support member is incurred.

A related object of this invention is to provide a pipe pulling device having its power cylinder disposed between the upstanding support member and the pipe and a stabilizer member extending lengthwise of the upstanding member on the opposite side thereof from the power cylinder to thereby equalize the forces on the upstanding member.

A further important object of this invention is to provide a lift means or yoke assembly having an adjustably extendable and retractable jaw member for engaging the pipe.

A still further important object of this invention is to provide a pipe pulling device having a power system for operating a lift means and a brake means whereby the power cylinders are connected in series such that the holding or brake cylinder is first to receive fluid under pressure and thereby absolutely prevent accidental de-energization of the holding cylinder; said lift cylinder being adapted to be operated after the holding cylinder has been set.

A further object of this invention is to provide a pipe puller device having a lift means and a pipe holding means, each having adjustable jaw members.

A still further object of this invention is to provide a pipe pulling device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the pipe pulling device;
FIG. 2 is a schematic drawing of the hydraulic and control means of the device;
FIG. 3 is a fragmentary side elevational view of the device;
FIG. 4 is a sectional view of the device taken along line 4—4 in FIG. 3; and
FIG. 5 is a cross-sectional view of the device taken along line 5—5 of FIG. 3.

The numeral 10 generally designates the ground surface having a drill hole 11 extending downwardly thereinto and a pipe 13 received thereby. The brake means portion of the device is generally indicated at 14. The numeral 15 designates a flat rectangular plate having a notch 17 formed therein. As seen in FIGS. 1 and 3, the plate 15 rests on the ground in such a position so that pipe 13 extends upwardly through notch 17. A pair of upstanding ears 19 and 21 are secured to the upper surface of plate 15, by means of welding or the like, between notch 17 and one of its ends and has a pin member 23 extending therebetween. Pin 23 has an elongated collar 25 rotatably mounted thereon which has an ear 27 secured thereto and extending upwardly therefrom as seen in FIGS. 1 and 3. Collar 25 has a tongue 26 secured thereto by welding which extends inwardly therefrom and which has a V-shaped notch 28 formed in its inner ends. A stop means 29 is secured to the upper surface of plate 15 by means of welding and extends upwardly therefrom as seen in FIG. 1 to limit the downward movement of tongue 26. An inverted V-shaped in cross-section guide member 200 is mounted on plate 15. A second inverted V-shaped in cross-section member 202 is selectively slidably mounted on member 200. A plurality of spaced apart slots 31 are formed therein. The plate 202 is adapted to be held in mating contact with plate member 200 by bolts 35 and 37 extending through slots 31 and 33 respectively and threadably received by plate 200.

An adjustment assembly for relative longitudinal movement is provided for the plates 200 and 202 and includes a bolt member 204 mounted on an ear 206 on the plate 202 and threadably received in a socket 208 on the plate 200. A jaw 210 vertically disposed and semi circular in cross-section is mounted on the forward end of the slidable plate 202 opposite the tongue 26.

As seen in FIG. 5, an elongated ear member 45 is secured at its lower end to the upper surface of plate 15 by means of welding or the like and extends substantially vertically upwardly therefrom. A hydraulic cylinder 47 is pivotally connected at its base to ear 45 by means of pin 49. Hydraulic cylinder 47 has its piston rod 51 pivotally secured to the upper end of ear 27 by means of pin 53. A conduit 55 is connected to hydraulic cylinder 47 and is in communication with the interior of hydraulic cylinder 47 at a point forwardly of piston 57. A conduit 59 is connected to hydraulic cylinder 47 and is in communication with the interior of hydraulic cylinder 47 at a point forwardly of piston 57.

An upright support 61 having an inclined leg portion 63 on its lower end is positioned adjacent brake means 14 as seen in FIGS. 1 and 3. A leg portion 65 is pivotally connected at its upper end to support 61 by means of pin 67. Secured to leg portion 65 by welding or the like is an ear member 69 extending upwardly therefrom which pivotally receives one end of a turnbuckle 71. The upper end of turnbuckle 71 is pivotally connected to a bracket 212 which is welded to a spacer member 214 on the back side of support 61. A second leg portion 73 is pivotally connected at its upper end to support 61. Secured to leg portion 73 by welding or the like is an ear 75 extending upwardly therefrom which pivotally receives one end of a turnbuckle 77. The upper end of turnbuckle 77 is pivotally connected to a bracket similar to bracket 212 which is welded to spacer 214 on the support 61.

A yoke means 83 is vertically movably mounted on support 61 and includes spaced apart shaped channel members 85 and 87. As seen in FIG. 3, yoke means 83 has an inclined portion 89 and a horizontal portion 91. A concave wheel 93 is rotatably mounted on yoke 83 by means of pin 95 extending between channel members 85 and 87 adjacent their upper ends which is adapted to engage support 61 as seen in the drawings. A concave wheel 97 is rotatably mounted on yoke means 83 by means of pin 99 extending between channel members 85 and 87 at a point downwardly from wheel 93 and is adapted to engage support 61 at a point opposite to where wheel 93 engages support 61.

Rotatably extending between channel members 85 and 87 is a pin 101 having a collar 103 rotatably mounted thereon. A tongue or jaw 105 has a V-shaped notch formed in its free end. A plate member 216 is secured to the collar 103 and extends between a pair of spaced apart portions 218 provided on the rear portion of the tongue 105. An adjusting bolt has a head 220 mounted in a recess formed in said plate 216 and its threaded portion 22 received in the rear end of said tongue. A locking bolt 224 extends transversely of said plate 216 and is adapted to engage the shank of the adjustment bolt. A stop means 109 is secured to and extends between channel members 85 and 87 in the pivotal path of tongue 105 to limit the downward movement of tongue 105. An operating handle 111 is secured to collar 103 by welding or the like and extends downwardly therefrom.

A substantially V-shaped jaw means 113 is pivotally connected at one of its ends to channel member 87 by means of pin 115 as seen in FIG. 1 and is adapted to grip pipe 13 at times. The other end of jaw means 113 is provided with a pair of vertically spaced holes which are adapted to receive pin 119. A vertically disposed collar 121 is welded to channel member 87 as seen in FIG. 1 and receives pin 119 when it is desired to close jaw means 113.

Secured to the inclined portion 89 of the channel member 85 by means of welding at a point are a pair of collars 123. A pipe hanger 125 is rotatably mounted at its inner end in collars 123 and has its outer end adapted to be received by the interior of pipe 13 and to support a section of pipe 13 at times.

A pin 226 is secured to yoke means 83 at the upper end thereof between the support 61 and the pipe 13. A hydraulic cylinder 129 is pivotally secured at its lower end by means of pin 130 to ear 131 which extends towards the pipe 13 from the support 61. Piston rod 133 of hydraulic cylinder 129 is pivotally connected to the pin 226 by means of an eye 228.

Hydraulic cylinder 129 has a conduit 137 connected thereto which is in communication with the interior thereof at a point below piston 139. Hydraulic cylinder 129 has a conduit 141 connected thereto which is in communication with the interior thereof at a point above piston 139.

In FIG. 2 the hydraulic circuitry is shown and includes a fluid reservoir 230 to which a pump 232 is connected and is provided with a pressure relief valve 234 in communication with the reservoir 230 through a pipe 236. A conduit 238 extends between the pump and a valve 240 which controls operation of the holding cylinder 47. The valve 240 is of a type which is spring biased to a neutral position wherein oil may be pumped through the valve and then when the valve is actuated in one of two other positions the fluid is pumped either through the conduit 55 or the conduit 59. When the oil is by-passing the valve 240 it is received in an outlet conduit 242 which connects with the inlet of a valve 244 controlling the lifting cylinder 129. The valve 244 is similar in operation to the valve 240 and is provided with an outlet conduit 246 which connects to the reservoir 230. Thus it is seen that the holding cylinder 47 always has sufficient fluid pressure from the pump 232 to hold the jaws 26 and 210 securely against the pipe 13 regardless of the condition of the lifting cylinder 129. Upon moving the actuating lever of the valve 240 to its neutral position, the pressure on the piston 57 in the holding cylinder 47 will remain the same.

A pipe 163 is telescopically received by the upper end of support 61 and maintained therein by pin 165 extending therethrough. At the upper end of pipe 163 is a pipe guide 167 secured thereto which extends outwardly therefrom. The outer end of pipe guide 167 embraces pipe 13 to prevent undesirable lateral movement thereof.

The pipe guide 167 includes an arcuate end portion 246 extending 180 degrees around the pipe 13 and merging into outwardly flaring side portions 247 which are interconnected by a base portion 248. A divider rod member 250 extends intermediate the side portions 247 from the base portion 248 and it terminates in a triangular shaped gate member 252 positioned in the open side of the arcuate end portion 246 and accordingly adjacent the pipe 13. The guide 167 is mounted on the member 163 by the divider rod 250 extending through the top end thereof and arranged such that it is spaced outwardly from the base portion 248. It is seen that between the gate member 250 and the side portions 246 a pair of passageways 249 are formed which communicate between an opening 250 extending through the arcuate portion 246 and storage openings 253 formed by the divider rod 250 and the side portions 247 and the base portion 248. The pipe 13 may be moved through the passageway 249 by flexing the side portions 247 to enlarge one of the passageways or by flexing the divider rod 250 at its outer free end by placing pressure on the gate member 252 and thereby enlarge one of the passageways 249 such that the pipe member 13 may pass therethrough.

The arrangement of the lifting cylinder 129 between the pipe 13 and the support 61 serves to equalize the pressures on the support 61 and is additionally assisted by a truss rod 254 which extends from an outwardly extended ear 256 at the upper end of the support member 61 over the intermediately disposed spacer element 214 to the lower end of the support member 61 adjacent the legs 65 and 73.

Further stabilization of the pipe puller unit is provided through the use of one or more pipe stand racks. Thus in FIG. 1 a pipe stand rack 260 is shown mounted at one end on the ground and supported by a rod 262 at its other end which is connected to the ear 131 to which the cylinder 129 is connected. The pipe stand rack 260 is directly below the adjacent storage openings 253 in the guide 167. By the use of a pair of pipe stand racks 260 preferably disposed on opposite sides of the cylinder 129, even greater stabilization is provided. The weight of the pipe pieces 13 in the stands 260 serve to further hold the unit in a stable condition.

The normal method of operation is as follows: When it is desired to remove a string of pipe 13 from a well it is simply necessary to position the device adjacent the pipe as previously described and as illustrated in the drawings.

The valves 240 and 244 would be operated so that the piston rods 133 and 51 would be moved inwardly into their respective hydraulic cylinders. The movement of the piston rod 133 into the hydraulic cylinder 129 causes the yoke means 83 to be moved to its downward position. The movement of the piston rod 51 into the hydraulic cylinder 47 causes the tongue member 26 to be pivoted downwardly into engagement with a pipe 13 as seen in FIG. 3.

The jaw means 113 would then be closed so that it occupied the position illustrated in FIGS. 3 and 4. The pipe 13 is then moved vertically upwardly from the drill hole 11 by simply causing the valve 244 to direct fluid into the conduit 137. When desired, such as at the end of the extension of the cylinder 129 which raises the yoke 83 its maximum distance, the valve 240 would be actuated to further close the jaw 26 against the pipe 13 to prevent it from slipping back into the well. The extension of the piston rod 133 causes the yoke means 83 to be moved upwardly on support 61. The concave wheels 93 and 97 insure that the yoke means 83 is moved upwardly on support 61 freely without any undesirable play. As the yoke means 83 is moved upwardly on the support 61, the V-shaped notch in the free end of the tongue 105 engages the pipe 13 and forces the pipe 13 against the jaw 113. The gripping action of the tongue 105 and the jaw 113 causes the yoke 83 to pull the pipe 13 vertically upwardly. Simultaneous with the extension of the piston rod 133 should be the extension of the piston rod 51 by actuation of the valve 240. The extension of the piston rod 51 causes the tongue 26 to be pivoted out of gripping engagement with the pipe 13 to enable the vertical movement of the pipe 13. When the yoke means 83 has reached its upper limits, it is simply necessary to operate the valve 244 to release the pressure on the cylinder 129 and then open the jaw 113 to remove the pipe 13 and place it in the pipe rack 260 with its upper end in one of the openings 253.

The withdrawal of the piston 139 into the hydraulic cylinder 129 causes the yoke 83 to be moved downwardly on the support 61. The tongue 105 pivots out of gripping engagement with the pipe 13 due to the downward movement of the yoke means 83. Simultaneously with the withdrawal of the piston rod 133 into the hydraulic cylinder 129, the valve 240 should be operated to retract the piston rod 51 into the hydraulic cylinder 47 whereby the tongue 26 is pivoted into gripping engagement with the pipe 13 thus forcing the pipe 13 against the jaw 210. The co-action of the tongue 26 and the jaw 210 serves to grip the pipe so that the pipe cannot inadvertently slip back down into the drill hole.

It is to be further appreciated that the jaw 210 can be selectively adjusted by operation of the adjustment assembly 208. Moreover, the tongue 105 on the yoke 83 may be selectively adjusted relative to the pipe 13 and the jaw 113 by operation of the adjusting bolt head 220. Accordingly, a plurality of different sized pipes may be accommodated.

It should also be noted that the turnbuckles 71 and 77 permit selective pivotal movement of the leg portions 65 and 73 to permit the device to be level regardless of the irregularities in the terrain adjacent the well.

If desired, when a section of pipe 13 has been removed from the remainder of the string of pipe, the lower end of the pipe section may be placed on the outer end of the pipe hanger 125 to support the same.

Thus it can be seen that the device provides a means for quickly and easily pulling a string of pipe from a well due to the reciprocal movement of the yoke means on a support. Thus it can further be seen that from the foregoing that the device accomplishes at least all of its stated objectives.

Some changes may be made in the construction and arrangement of my pipe pulling device without departing from the real spirit and purpose of my invention, and it is my intention to cover by my claims, any modified forms of structure or use of mechanical equivalents which may be reasonably included within their scope.

I claim:
1. In a pipe puller, comprising,
an upstanding support means,
a yoke means vertically movably mounted on said support means adapted to grip a pipe when said yoke means moves upwardly on said support means,
means operatively connected to said yoke means to move said yoke means upwardly and downwardly on said support means,
a brake means operatively engaging said pipe; said brake means gripping said pipe to prevent the downward movement thereof when said yoke means moves downwardly on said support means and adapted to release said pipe when said yoke means moves upwardly on said support means, and
a pipe guide being secured to the upper end of said support means, said guide having first and second openings being in communication with each other, a gate disposed between said first and second openings, said second opening being provided with a divider which divides said second opening into a pair of openings, said first opening being in communication with each of said pair of openings through said gate, and a gate member being mounted on said divider adjacent said first opening.

2. In a pipe puller, comprising,
an upstanding support means,
a yoke means vertically movably mounted on said support means adapted to grip a pipe when said yoke moves upwardly on said support means,
means operatively connected to said yoke means to move said yoke means upwardly and downwardly on said support means,
a brake means operatively engaging said pipe; said brake means gripping said pipe to prevent the downward movement thereof when said yoke means moves downwardly on said support means and adapted to release said pipe when said yoke means moves upwardly on said support means, and
a pipe guide is secured to the upper end of said support means, said guide forming an enclosure and having a divider extending from one end to adjacent the opposite end, the free end of said divider and the adjacent side portions of said guide forming passageways therebetween for communication between said one end on either side of said divider and said other end.

3. The structure of claim 2 wherein said side portions of said guide are flexible for movement towards and away from said divider whereby said passageways may be selectively enlarged for moving pipe back and forth between said one end and the other end of said guide.

4. In a pipe puller, comprising,
an upstanding support means,
a yoke means vertically movably mounted on said support means adapted to grip a pipe when said yoke means moves upwardly on said support means,
means operatively connected to said yoke means to move said yoke means upwardly and downwardly on said support means,
a brake means operatively engaging said pipe; said brake means gripping said pipe to prevent the downward movement thereof when said yoke means moves downwardly on said support means and adapted to release said pipe when said yoke means moves upwardly on said support means, and
a pipe guide is secured to the upper end of said support means, a pipe stand rack is provided below said pipe guide, means securing said rack at one end to said support means and support surface engaging means at the opposite end of said rack.

5. The structure of claim 4 wherein a second pipe stand rack is provided on the opposite side of said supporting means from said first mentioned rack, means securing said second rack at one end to said support means and support surface engaging means at the opposite end of said second rack.

6. In a pipe puller, comprising,
an upstanding support means,
a yoke means vertically movably mounted on said support means adapted to grip a pipe when said yoke means moves upwardly on said support means,
means operatively connected to said yoke means to move said yoke means upwardly and downwardly on said support means,
a brake means operatively engaging said pipe; said brake means gripping said pipe to prevent the downward movement thereof when said yoke means moves downwardly on said support means and adapted to release said pipe when said yoke means moves upwardly on said support means, and said means for moving said yoke means is a vertically disposed cylinder positioned between said support means and said pipe, one end of said cylinder being connected to said yoke and the other end being connected to said support means, a stabilizer member being connected at one end to the lower end of said support means and at its other end to the top end of said support means above said yoke, and said stabilizer member being positioned on the opposite side of said support means from said cylinder.

7. In a pipe puller, comprising, an upstanding support means, a yoke means vertically movably mounted on said support means adapted to grip a pipe when said yoke means moves upwardly on said support means, means operatively connected to said yoke means to move said yoke means upwardly and downwardly on said support means, a brake means operatively engaging said pipe; said brake means gripping said pipe to prevent the downward movement thereof when said yoke means moves downwardly on said support means and adapted to release said pipe when said yoke means moves upwardly on said support means, and a first hydraulic cylinder is provided for moving said yoke means upwardly and downwardly and a second hydraulic cylinder is provided for moving said brake means into and out of gripping engagement with said pipe, and a first valve means fluidly connected to each end of said second hydraulic cylinder, said first valve means having an inlet and an outlet with a hydraulic power source fluidly connected to said valve inlet, a second valve having an inlet and outlet connected through said inlet to said outlet of said first valve, said first cylinder being connected at each end to said second valve, and means on said first valve for at times selectively directing said fluid under pressure to one end or the other end of said second hydraulic cylinder and at other times while maintaining pressure on said second cylinder directing fluid to said second valve, and means on said second valve for at times selectively directing said fluid under pressure to one end or the other of said first hydraulic cylinder and at other times directing said fluid to the outlet of said second valve.

8. In a pipe puller, comprising, an upstanding support means, a yoke means vertically movably mounted on said support means adapted to grip a pipe when said yoke means moves upwardly on said support means, means operatively connected to said yoke means to move said yoke means upwardly and downwardly on said support means, a brake means operatively engaging said pipe; said brake means gripping said pipe to prevent the downward movement thereof when said yoke means moves downwardly on said support means and adapted to release said pipe when said yoke means moves upwardly on said support means, and said yoke means includes a yoke member having first and second spaced apart wheel means rotatably mounted thereon, said first and second wheel means engaging opposite sides of said support means, said yoke means having a gripping means thereon which grips said pipe when said yoke means moves upwardly on said support means, and said means for moving said yoke means is a vertically disposed power cylinder positioned between said support means and said pipe, one end of said cylinder being connected to said yoke and the other end being connected to said support means.

References Cited

UNITED STATES PATENTS

| | | | |
|---|---|---|---|
| 493,392 | 3/1893 | Wanamaker | 254—31 |
| 638,001 | 11/1899 | Bergerson | 254—31 |
| 765,364 | 7/1904 | Kohout | 254—31 |
| 2,167,584 | 7/1939 | Morue | 211—60 |
| 2,568,294 | 9/1951 | Nichols | 81—65 |
| 2,692,059 | 10/1954 | Bolling | 175—85 X |
| 2,998,084 | 8/1961 | Johnson et al. | 175—85 |

WILLIAM FELDMAN, *Primary Examiner.*

MILTON S. MEHR, *Examiner.*